United States Patent

Ng

[11] Patent Number: 5,327,524
[45] Date of Patent: Jul. 5, 1994

[54] ELECTROPHOTOGRAPHIC RECORDING WITH MULTIPLE-BIT GREY LEVEL LED PRINTHEAD WITH ENHANCED ADDRESSABILITY

[75] Inventor: Yee S. Ng, Rochester, N.Y.

[73] Assignee: Eastman Kodak Company, Rochester, N.Y.

[21] Appl. No.: 996,996

[22] Filed: Dec. 28, 1992

[51] Int. Cl.$^5$ ............................................. G06F 15/00
[52] U.S. Cl. ...................................... 395/108; 395/101
[58] Field of Search ............... 395/108, 115, 110, 101; 346/154, 160; 358/300, 462, 467; 400/119

[56] References Cited

U.S. PATENT DOCUMENTS

| | | |
|---|---|---|
| 4,746,941 | 5/1988 | Pham et al. |
| 4,750,010 | 6/1988 | Ayers et al. |
| 4,847,641 | 7/1989 | Tung ................................... 346/154 |
| 4,887,225 | 12/1989 | Yao ...................................... 395/108 |
| 5,025,322 | 6/1991 | Ng . |
| 5,111,217 | 5/1992 | Zeise . |
| 5,126,759 | 6/1992 | Small et al. |
| 5,138,337 | 8/1992 | Ng . |

FOREIGN PATENT DOCUMENTS

91/10311 1/1990 World Int. Prop. O. .

Primary Examiner—Arthur G. Evans
Attorney, Agent, or Firm—Norman Rushefsky

[57] ABSTRACT

A recording apparatus and method wherein a plurality of LEDs record pixel information on an electrophotographic recording medium. The LEDs are driven by a grey level driver to control the size of each pixel. The location of a pixel is controlled during a main line recording period to shift the pixel's centroid or center. Where a pixel is located at an edge or border of a text-like structure and its centroid is shifted to reduce edge raggedness, an exposure duration of the LED is increased to compensate for overlap with pixels that are within the text-like structure.

22 Claims, 6 Drawing Sheets

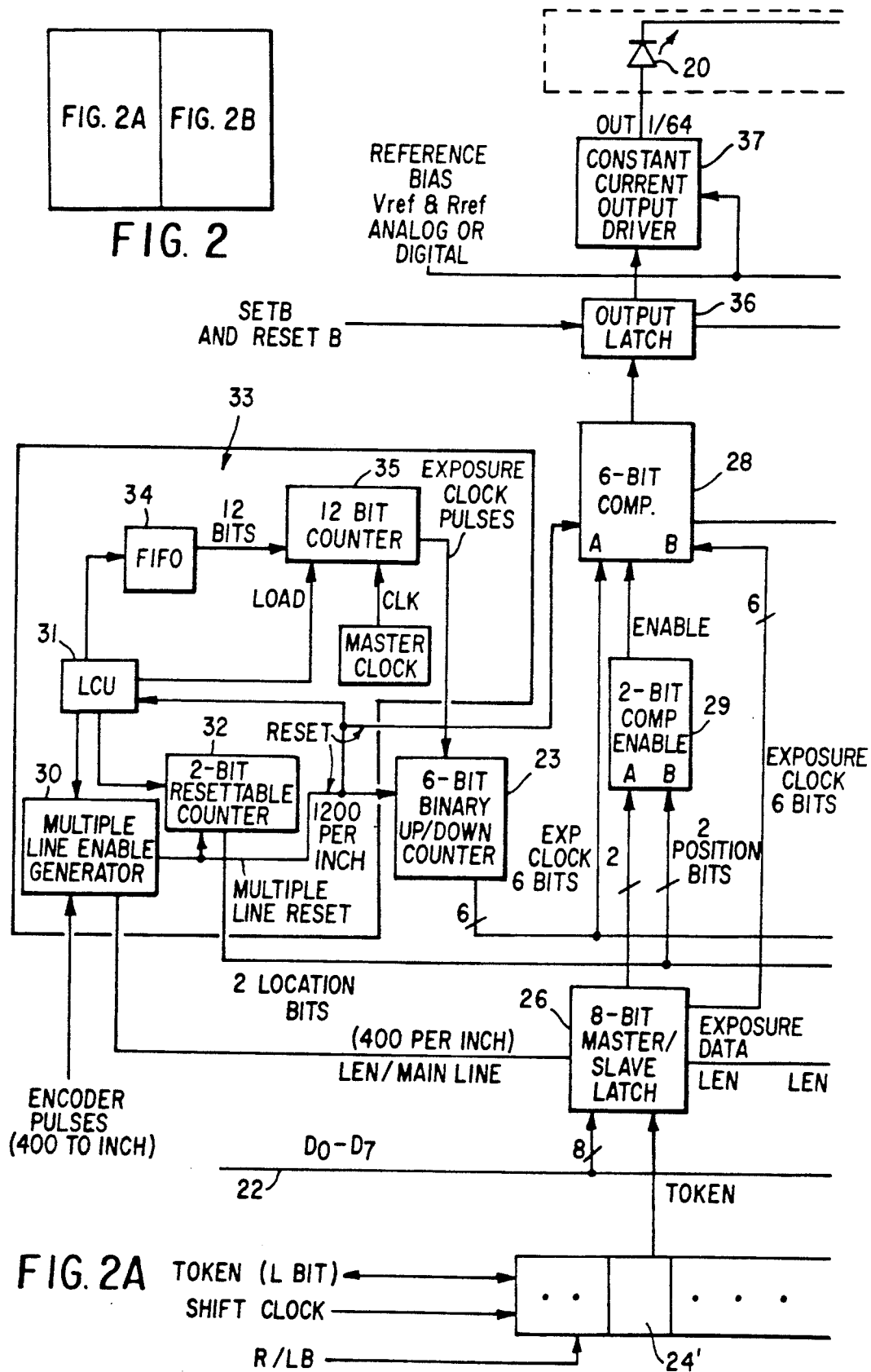

ELECTROPHOTOGRAPHIC RECORDING WITH MULTIPLE-BIT GREY LEVEL LED PRINTHEAD WITH ENHANCED ADDRESSABILITY

BACKGROUND OF THE INVENTION

1. Field of the Invention

The present invention relates to non-impact printing apparatus and method for recording using printheads having a plurality of recording elements such as light-emitting diodes (LEDs) or the like.

2. Brief Description of the Prior Art

In electrophotographic recorders using a fixed sized dot low resolution output printer, the smoothness of text and line graphics suffers due to line raggedness of near vertical and near horizontal lines. To reduce the "scalloped" effect on the near vertical and horizontal lines, one can increase the printing resolution (or dpi) of the writing system (but typically this entails much higher costs). Another way to do this is to use multiple dot sizes that can be done with a grey level LED printhead either via multi-bit pulsewidth modulation (PWM) methods such as proposed in U.S. Pat. No. 4,750,010 or binary multiple address printing methods such as proposed in U.S. Pat. No. 5,138,337. But there is a limit on the dot size variation (dynamic range between maximum and minimum size) due to exposure emitter size constraints, MTF of the lens and the toner's capability to carry a very small dot by itself. Therefore, it is desirable to be able to shift the centroids of the exposure dots or pixels so that smaller size dots can be placed closer to other larger dots for process stability reasons. Also, one can get a better dot edge placement at the same time. One way to do this is to use multiple address printing methods in either a binary printhead or just a regular multiple-bit printhead running in the multiple address mode; see for example U.S. Pat. No. 5,025,322. Since the data for every sub-line has to be reloaded in the multiple address mode, the printing speed of the system is usually slower. One can speed that up with multiple input data lines, but cost and the size of the system goes up significantly. Therefore, it is desirable and an object of the invention to provide a printer apparatus and method that is adapted to record multiple dot sizes, have centroid shift capability to enhance rendition and have a faster data loading capability for use with higher speed recording systems.

SUMMARY OF THE INVENTION

The above and other objects of the invention are achieved by a non-impact printer apparatus comprising an electrophotoconductive recording medium; means including a plurality of recording elements for cooperating with said medium to produce a modulated electrostatic charge on said medium representing an image to be recorded; driving means, responsive to an enablement signal, for driving the recording elements for recording the image; control means for controlling enablement times of the driving means for driving the recording elements during a main line pixel recording period for recording a line of pixels by said plural recording elements, said control means including (a) register means associated with each recording element for storing a respective multibit data signal representing a recording duration for recording a pixel by a respective recording element during one of plural sub-lines comprising said main line period, (b) means for generating during each sub-line period a series of signals representing a time-changing count during a count cycle, the count recycling to establish plural pixel recording periods during said main line recording period, and (c) comparator means for comparing a first multibit signal with a signal representing a particular sub-line period and for comparing a second multibit data signal with said count to enable the driving means during the particular sub-line period for a time related to said second multibit data signal.

DETAILED DESCRIPTION OF THE DRAWINGS

In the detailed description of the preferred embodiments of the invention presented below, reference is made to the accompanying drawings in which:

FIGS. 2A and 2B are a schematic of a printer circuit for recording grey scale information in accordance with the invention;

DETAILED DESCRIPTION OF THE PREFERRED EMBODIMENTS

Because apparatus of the type described herein are well known, the present description will be directed in particular to elements forming part of, or cooperating more directly with, the present invention.

Figure 1:
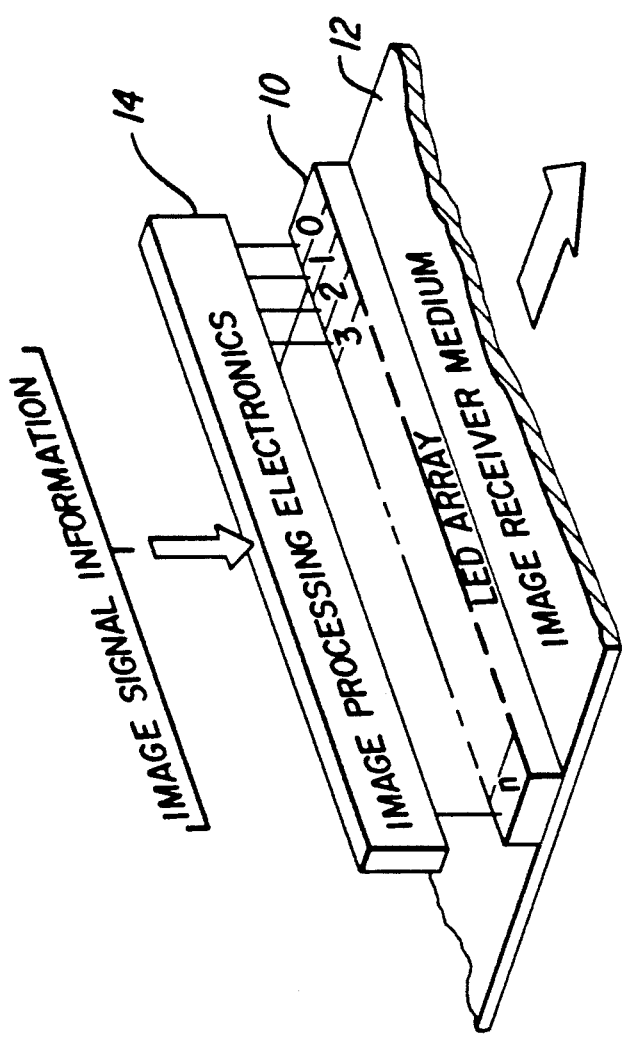
FIG. 1 is a perspective view illustrating the general arrangement of a non-impact printer as used in the embodiment of the invention and as known in the prior art.

The apparatus for the herein disclosed invention is typified by the diagram of FIG. 1. A linear array 10 of say 3584 triggerable recording elements or radiation sources; e.g. LEDs, is disposed to expose selectively a photosensitive image-receiver medium 12 that is movable relative to the array by suitable conventional means (not shown). Assume that the LEDs are so sized and spaced uniformly so as to be disposed at 400 dots per inch (dpi). Optical means for focusing the LEDs onto the medium may also be provided. In this regard, gradient index optical fiber devices such as Selfoc (trademark of Nippon Sheet Glass Co., Ltd.) arrays are highly suited. The LEDs of the array are triggered into operation by means of image processing electronics 14 that are responsive to image signal information. Depending on the duration for which any given LED is turned on, the exposure effected by such LED is more or less made. Where the medium 12 is, say, photographic film the latent image formed line by line by selective exposure of said LEDs may be subsequently developed by conventional means to form a visible image. However, the invention is particularly suited to recording on a medium 12 that is an electrophotographic receptor. The LEDs may be used to form an electrostatic image on a uniformly electrostatically charged photoconductor and this image developed using colored toner particles and perhaps transferred to a copy sheet, see U.S. Pat. No. 3,850,517, the contents of which are incorporated herein by this reference.

With reference to now FIG. 4, there is shown a block diagram of the data flow for implementation of one exemplary embodiment of the invention using a grey level LED printhead of the invention to be described in more detail below. A word processor text file prepared using an appropriate word processing program is formatted into a PostScript ® file or other page description language file which in turn is rendered by a PostScript ® interpreter into a high resolution (600 dpi) binary image file. The 600 dpi binary image file is converted to a 300 dpi, 2 bits per pixel, grey level file by taking sequential 2×2 binary data bit blocks and adding the binary "1" bits in the 2×2 bit blocks and mapping the sum into a 300 dpi, 2-bits per pixel map. Since 2-bits define a maximum grey level of 3, sums of 3 or 4 are designated at grey level 3. Each of the 2-bits per pixel image data now stored at a resolution of 300 dpi is subjected to a classification to optimize printing thereof in accordance with the processing conditions for printing. Typically, when one uses higher bit depth systems (like 4-bits per pixel), one finds that using an equal lightness (on the output achromatic print) exposure generates a good result for both text and halftone. However, with a lower bit depth of just 2-bits per pixel, optimal results particularly as to smoothness of edges are achieved by a skewed exposure for text and graphics whereas pictorial subject matter is exposed using equal lightness exposure steps. Thus, in accordance with the invention more fully described in my copending Ser. No. 07/976,915, filed Nov. 16, 1992 and entitled "Low Resolution Grey Level Printing Method From High Resolution Binary Input File", the pixels are classified as either text-graphics or pictorial. This is relatively easily done since the page description language contains or may be amended to contain information relative to the different areas of each page as to these classifications.

In accordance with the invention of the aforementioned application where the bit depth is low (i.e., only 2-bits per pixel to define all the grey levels), the available exposures for recording pixels classified as text-graphics are skewed toward the high end (long exposures) particularly for text-graphics. Thus for text exposures, lightness values $L_1$, $L_2$ and $L_3$ have corresponding exposure times over $T_1$, $T_2$ and $T_3$ which do not extend in even steps over the entire broad exposure range but instead are skewed towards the long exposure end. Thus, there may be evenly spaced steps of $L_1$, $L_2$ and $L_3$ over a narrow range of the lower values of lightness. The reason for this is that for text-graphics printing, the sharpness information on the edge is very important and a discharged area development process appears to provide, for low bit depths, better edge sharpness when exposures are so skewed. Otherwise a pixel at the low exposure end may not develop and edge raggedness may result. On the other hand, for pictorial information, edge sharpness is less important but density contouring is more important and exposures providing equal lightness steps are preferred. A similar effect can be noted in a charged area development process so that it may be desirable to skew exposures towards the low exposure end to minimize pixels that don't develop.

Edge sharpness is further obtained by examining each 2×2 binary data bit blocks and characterizing the arrangement of pixels therein for purposes of shifting the printed grey level pixel to enhance the printed edge.

Figure 4:
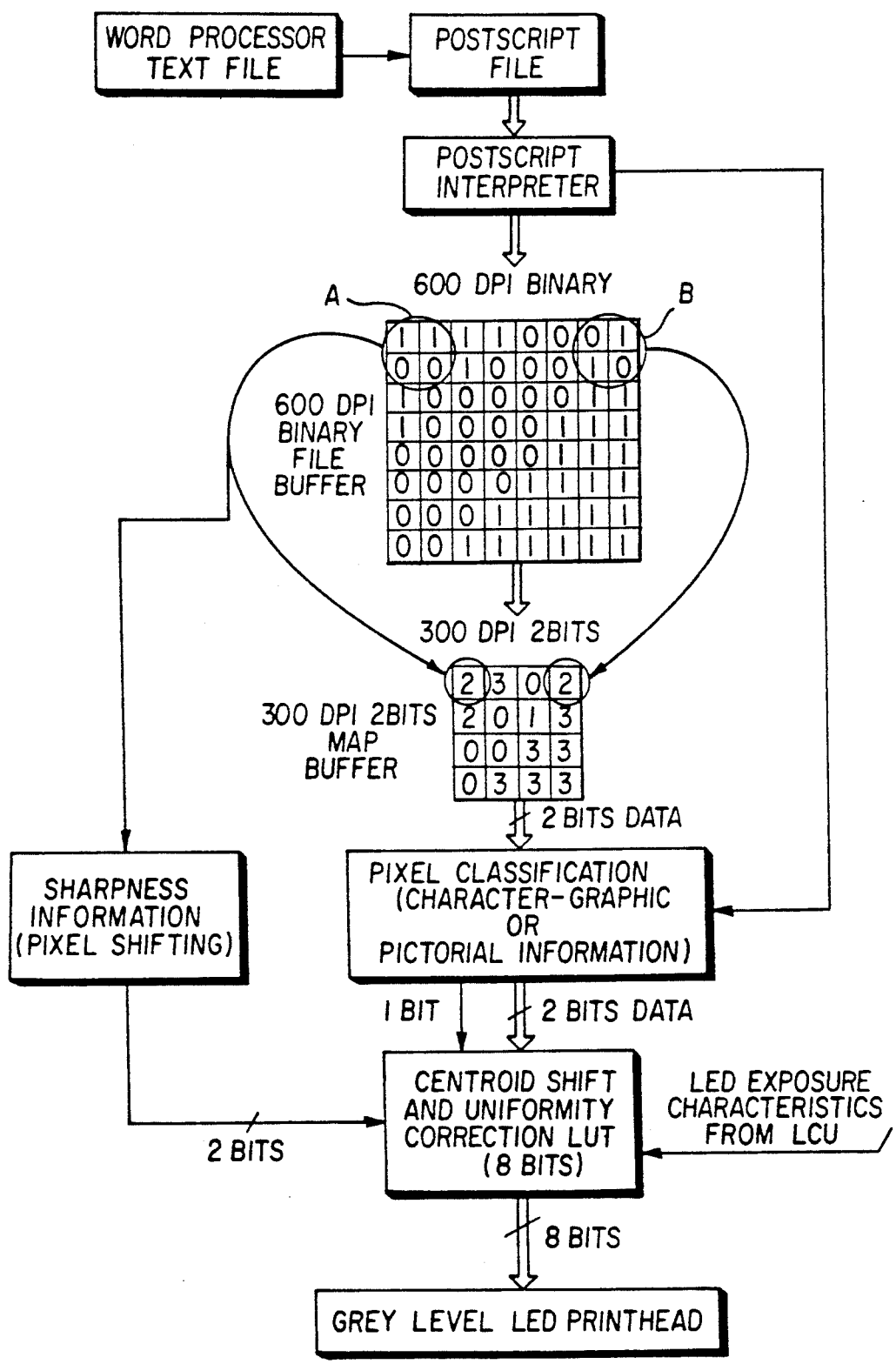
FIG. 4 is a flowchart illustrating one embodiment for generating a data signal that includes information relative to centroid position.

As may be seen in FIG. 4 in the 2×2 binary pixel blocks A and B, both will be printed with a grey level 2. However, it is clear that the grey level pixel representing data of block A is best rendered by shifting the pixel upwardly, whereas the corresponding pixel for the data of block B may be rendered more accurately by a more centered pixel.

Figure 2B:
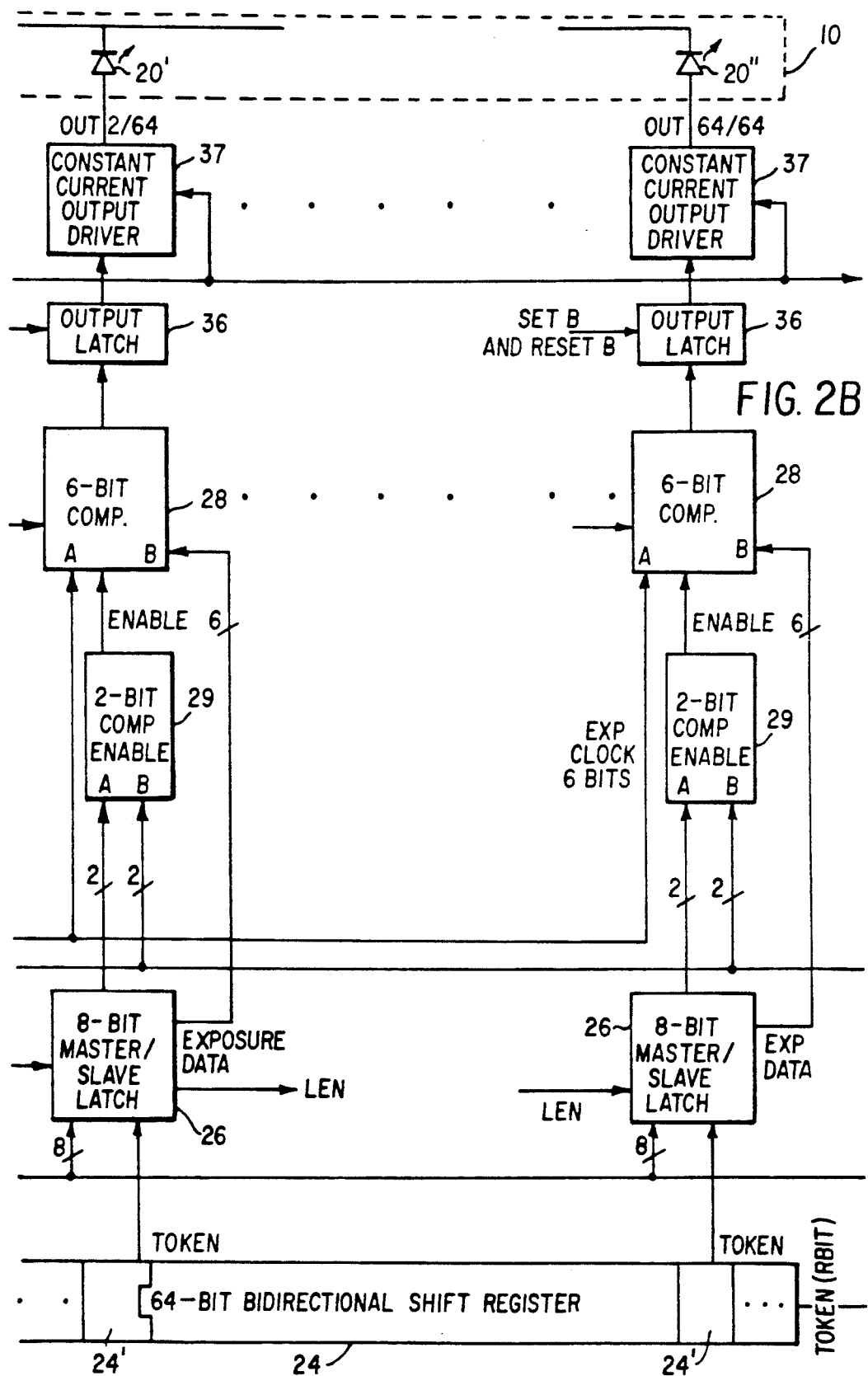

With reference now to FIG. 2, a circuit is shown which may be used for triggering selectively the LED's 20, 20', 20", etc. that together comprise an array 10 of 128 of the 3584 LEDs that are arranged in a line across the width of the recording medium. Only the associated driver circuitry for driving three of the LEDs is shown for clarity purposes, it being understood that the circuitry for driving such other LEDs is similar to that described for the illustrated examples. While the figure shows all the driver circuitry associated with the LEDs located to one side of the line of LEDs, it is well known to place these circuits on both sides of the line of LEDs to provide more efficient utilization of space.

Data to be printed for each line of pixels to be recorded is in the form of binary digital signals, e.g., 1's and 0's. This data on lines labeled $D_0$–$D_7$ are outputted in parallel onto the data bus 22 from the uniformity look-up table memory (see FIG. 4 shown). The inputs to the look-up table memory (LUT) comprise, say as shown in FIG. 4, a two-bit signal representing pixel centroid position or sharpness information, i.e., shift up, center (no shift), shift down for a three-position centroid placement. Note that two bits can also define up to four positions of centroid placement. In addition, 1 bit is used to define whether the information is character-graphic information or pictorial information, particularly where the development system involves discharged area development. Two bits of data input into the LUT represent the grey level of the pixel as described above. An additional input into the LUT is a multibit signal representing the characteristics of the LEDs. As is known, LEDs in an array will vary in light output uniformity and can be classified into groups that are of generally similar characteristics. The logic and control unit for the writer in response to a signal representing a count identifies the particular LED to be used to print a particular grey level pixel and supplies from memory a code indicative of the characteristics of that LED. This code is then also input to the LUT so that the collective signals input thereto represent an address to a specific eight-bit signal that represents an exposure duration for recording that particular grey level by the particular LED and providing appropriate centroid shifting of the pixel. The eight-bit data signals on lines $D_0$–$D_7$ thus comprise, in this example, a series of corrected six-bit data signals representing an exposure time count for a particular LED for printing a single grey level recorded dot and synchronously with the generation of each such six-bit data signal, there is also generated by the look-up table memory, a two-bit signal on bus 22 identifying an exposure sub-line for recording the six-bit data signal. Each of the six-bit data signals, as will be discussed below, that relates to the line of recorded pixels can be recorded during one of three sub-line recording periods during the main line period for recording the line of pixels.

In FIG. 2, the circuit enclosed by the dotted lines is outside a silicon driver integrated circuit driver chip. The rest of the circuit is a description of the driver chip itself except for the LED array 10 which is electrically connected to the output of the driver chip. Here it is assumed to use a plurality 400 dpi LED arrays with silicon drivers or driver chips that have 64 output channels each. Thus, there is shown in FIG. 2 the schematic for one such driver. The driver has a 64 bi-directional shift register 24 for passing a token bit. An SHCLK signal is used to shift the token bit and an R/LB (right-/left bit) signal is used to control whether the token is shifted from left to right or right to left, therefore only one type of chip needs to be made for a printhead with drivers on both sides of the LED arrays. Assume that each LED array includes 128 LEDs and the 64 channels of each driver chip drives every other LED of the array. Further description relative to operation of a grey level printer with a token bit is provided in U.S. Pat. Nos. 4,746,941 and 5,126,759, the contents of which are incorporated herein by this reference. Each channel within the driver has an eight-bit master/slave latch 26. The data for a particular pixel that is loaded from bus 22 has eight-bits (six-bits represent corrected grey level, and more precisely, exposure time and two bits represent centroid location). The eight-bit signal is presented simultaneously to the input of a respective eight-bit master/slave latch 26. Only one master/slave latch will accept an eight-bit data signal when the token is in a respective stage 24' of token register 24 and this data is used for driving only one of the LEDs of the array.

A circuit external to the driver has a multiple line enable generator 30, a two-bit resettable counter 32 and an exposure clock generator 33. This circuit uses a printing machine generated encoder pulse that in this example provides 400 pulses per inch that synchronizes the continuously moving film or recording medium 12 location with printing pulses as is well known. The multiple line enable generator 30 is used to generate 1200 multiple line reset pulses per inch and also 400 latch enable main line pulses per inch in synchronization with the encoder pulses. The generator 30 can use a phase-lock loop or other well known circuit to provide these pulses. The LEN or latch/enable main line pulse is used to latch into the output stages of all the latches 26 the whole line of data for recording a line of pixels along the cross-track direction of the recording medium 12. The multiple line reset pulse is used as an input to the two-bit resettable counter 32 to change the count output of the counter 32 and also as the resets for an on-chip six-bit binary up/down counter 23 and an on-chip six-bit comparator 28. The output of the two-bit resettable counter 32 is a time-changing two-bits location signal and will present to the system which location or sub-line within the 1/400 inch the medium 12 is at between main latch line pulses which define a main line period. The count represented by the two-bits location signal is then compared with the two-bits position data signal that is already on the output stage of the eight-bit master/slave latch 26 in a two-bit comparator 29 (of which the driver also has 64 per chip). If there is a match between the location bits signal and the two-bits position data signal, then an enable is sent to start the six-bit comparators 29 (there are 64 six-bit comparators 28 for each driver chip).

Figure 3:
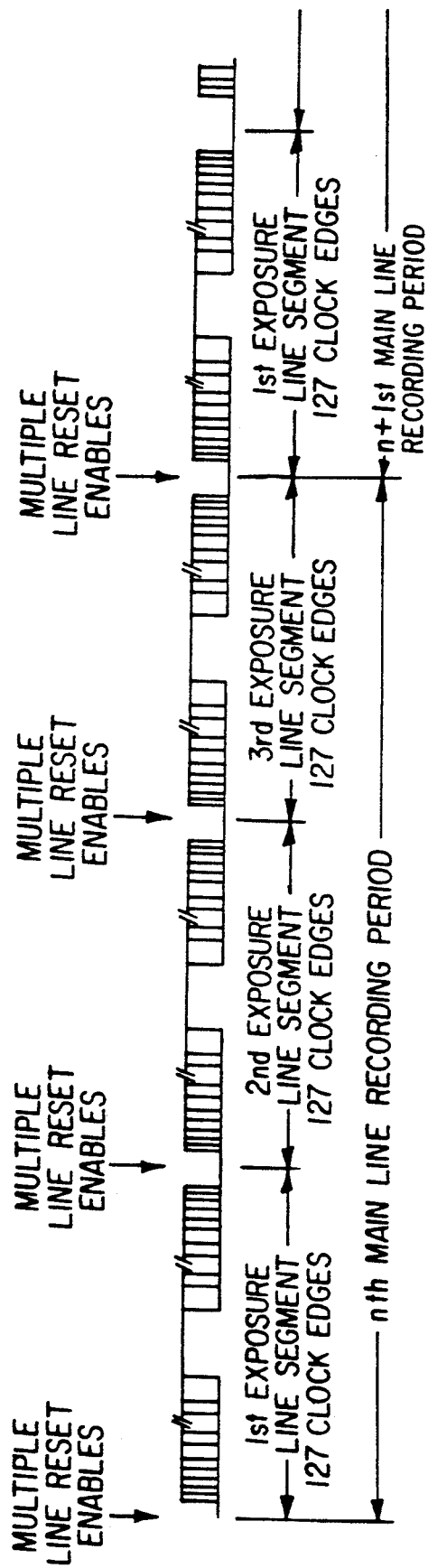
FIG. 3 is a timing diagram illustrating a clocking scheme used in the printer circuit of FIG. 2

In this embodiment, it is assumed to use a center-weighted pulsewidth modulation scheme (see U.S. Pat. No. 4,750,010 and PCT International Publication No. WO 91/10311, the contents of which are incorporated herein by this reference) to control the exposure energy impinging on the film or recording medium plane. A series of non-linear exposure clock pulses may be generated external to the driver via a FIFO memory 34, a twelve-bit programmable counter 35 and a higher frequency master clock 36. The exposure clock pulses are generated by the counter 35 counting master clock pulses up to a programmed count provided by FIFO memory 34. As the programmed count changes, the spacing between exposure clock pulses change. The clock pulse generation is controlled by the LCU 31 and is reset in response to the multiple line reset signal. Thus, a series of non-linear exposure clock pulses (see FIG. 3) has 127 clock edges with different timing space between the clock edges and these form a set of clock pulses. Therefore, within one main line recording period (every 1/400th of an inch of film travel in this example), there are 3 sets of these exposure clock pulse series generated. Assume these 3 sets are similar. The exposure clock pulses are input to the on-chip six-bit binary up/down counter 23. The multiple line reset signal is used to reset the twelve-bit counter and also the six-bit up/down counter 23. After reset, the six-bit up/down counter 23 will have all output bits set high. As the exposure clock pulses are input to the up/down counter 23, the output count of counter 23 will change with time (decrease with time) and upon reaching zero will remain zero for a period $T_{MIN}$ and then count up again to the highest value. Then it has to be reset to be used. The driver chip may have one six-bit up/down counter per chip.

The six-bit corrected exposure data from the eight-bit master/slave latch 26 is compared with the output value of the six-bit up/down counter 23 in each six-bit comparator 28. If the particular channel is not supposed to be started in this sub-line, then the enable for the six-bit comparator is not on and the respective LED 20 is not turned on. If the two position bits stored in latch 26 for the particular pixel and the location count of the system identified by a signal from counter 32 match, then the six-bit comparator 28 is enabled and the six-bit data will be printed by driving the respective recording element. The six-bit time-changing exposure clock value from counter 23 is thus compared with the six-bit data value from latch 26. If there is a match, the output of the six-bit comparator 28 will be the appropriate signal for enabling the current driver 37 when the first comparison is made and will cause current to be stopped when the second comparison is made. The six-bit comparator is reset by the multiple line reset signal. The output of the six-bit comparator 28 may be stored in an output latch 36 which in turn drives a constant current output current driver for each channel. The constant current output driver 37 is connected to a respective LED emitter 20, 20', 20", etc. Therefore, when the output of the six-bit comparator is active, the LED is turned on. If the pixel is recorded during the first of the three sub-line recording periods, its centroid is shifted relatively upwardly towards the previous line of recorded pixels. If recorded during the second of the three sub-line recording periods, its centroid will be in the center of the line of recorded pixels and if recorded during the third of the three sub-line recording periods, its centroid will be shifted relatively downwardly towards the next to be recorded line of pixels. When the output of the six-bit comparator is not active, the LED is turned off. A $V_{ref}$ and $R_{ref}$ (either analog or digital with or without temperature compensation) bias signals may be provided on the output latch for testing purposes. When printing one main line of pixels, the data for the next main line is also being loaded into the inputs of the latches 26.

Figure 5:
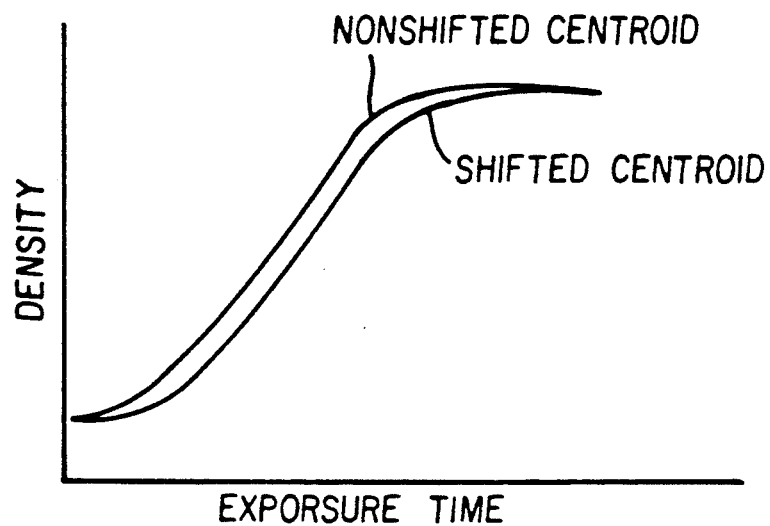
FIG. 5 is a graph illustrating a relationship between exposure time and density for a typical LED for exposures involving shifted and nonshifted centroid and FIG. 6 is an illustration of pixel exposures proximate to an edge of a text or graphic image.
Figure 6:
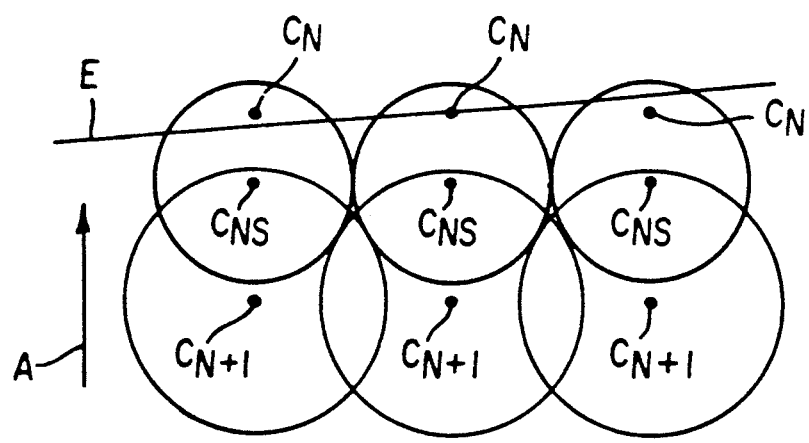

With reference to FIGS. 5 and 6 in order to reproduce an edge E that may be part of an outline of a character or graphic image, the advantages of centroid shift can be seen in terms of providing for smoother edges even with round pixels. Note that in FIG. 6 the unshifted centers of the pixels for line N are indicated as $C_N$. The next line to be printed represents pixels that are inside the edge and have centers $C_{N+1}$. In this example, the centroids of some of the pixels for line N are shifted down towards the following line N+1 so that the centers are now at $C_{NS}$. Shifting of centroids for a text-graphic information typically involves edge pixels and involves either movement upwardly or downwardly relative to a "normal" centroid position at the center of each 1/400 inches of movement of the recording medium, which movement is indicated by direction arrow A. As a large part of the exposure for pixels that have been shifted will overlap with exposures for pixels inside the edges or borders of say text information, it can be advantageous to increase the size of the pixels to preserve the density for the image at the edge. Thus, in the centroid shift and uniformity correction LUT of FIG. 4, the LUT may have the exposure time durations also skewed to provide even longer duration exposure times for text-graphic pixels having shifted centroids so as to further reduce edge raggedness. For example, for the same LED and density data signal there may be different exposure time values for a pictorial pixel, a character-graphic pixel without centroid shifting, and a character-graphic pixel with centroid shifting. Provision may be made for increasing exposures by having the density signal itself be adjusted for centroid shift. The concept of increasing exposure times for centroid shifted pixels is also applicable to binary architectured LED printheads operated in a multiple address mode, see for example my U.S. Pat. No. 5,138,337.

In lieu of the exposure clocking scheme described, the invention also contemplates that exposure clock pulses may be generated in other ways such as for example that described in U.S. application Ser. No. 07/807,522, filed in the names of Kelly et al. In addition the comparators 28, 29 can be combined into one.

The invention also contemplates that adjustments to light output intensity (or other exposure parameters) may be made by controlling current to an LED in response to a signal to shift the centroid.

Advantages

As has been described above, printing data can be loaded within the 1/400th inch main pixel recording line period, but printing can be done with either one of the 3 printing locations within the 1/400th inch (with an enhanced addressability of 1200 per inch). Thus, one can do data loading (only load once within 1/400 inch) and enhanced printing addressability and apparent resolution enhancement simultaneously. Of course, here with multible bit LED exposure, one can do multiple dot size with non-uniformity correction simultaneously with the above goal. The upper limit of 33% duty ratio for exposure time is not necessarily too much of a problem due to the increase in brightness of LEDs of GaAsP and GaAlAs materials. The result is that one can get high speed grey level printing with enhanced addressability to reduce line raggedness and improved line placement accuracy.

The invention has been described in detail with particular reference to preferred embodiments thereof, but it will be understood that variations and modifications can be effected within the spirit and scope of the invention.

I claim:

1. A non-impact printer apparatus comprising:

an electrophotoconductive recording medium;

means including a plurality of recording elements for cooperating with said medium to produce a modulated electrostatic charge on said medium representing an image to be recorded;

driving means, responsive to an enablement signal, for driving the recording elements for recording the image;

control means for controlling enablement times of the driving means for driving the recording elements during a main line pixel recording period for recording a line of pixels by said plural recording elements, said control means including:

(a) register means associated with each recording element for storing a respective first multibit data signal representing a recording duration for recording a pixel by a respective recording element during one of plural sub-line recording periods comprising said main line period, (b) counter means for generating during each sub-line period a series of signals representing a time-changing count during a count cycle, the count recycling to establish plural pixel recording periods during said main line recording period, and (c) comparator means for comparing a second multibit signal with a signal representing a particular sub-line period and for comparing the first multibit data signal with said count to enable the driving means during the particular sub-line period for a time related to said first multibit data signal; and wherein the counter means during each sub-line period is in a count-down mode and count-up mode.

2. The apparatus of claim 1 and wherein the control means includes second counter means for generating said signal representing a particular sub-line period.

3. The apparatus of claim 2 and including means for generating the second multibit signal representing a centroid shift of the pixel from a central position in the main line recording period.

4. The apparatus of claim 1 and including means for generating the second multibit signal representing a centroid shift of the pixel from a central position in the main line recording period.

5. The apparatus of claim 1 and wherein the recording elements are light-emitting diodes.

6. A method for recording which comprises:

selectively energizing a plurality of recording elements arranged relative to a recording medium to produce on said medium an image to be recorded;

controlling enablement times of the recording elements during a main line pixel recording period for recording a line of pixels by said plural recording elements, the step of controlling including the steps of:

(a) storing a respective first multibit data signal representing a recording duration for recording a pixel by a respective recording element during one of plural sub-line recording periods comprising said main line period, (b) generating during each sub-line period a series of exposure clock signals representing a time-changing count during a count cycle, the count recycling to establish plural pixel recording periods during said main line recording period, each count cycle including a count-down mode and a count-up mode, and (c) comparing a second multibit signal with a signal representing a particular sub-line period and comparing the first multibit data signal with said count to enable a recording element during the particular sub-line period for a time related to said first multibit data signal.

7. The method of claim 6 and including generating the second multibit signal representing a centroid shift of the pixel from a central position in the main line recording period.

8. The method of claim 8 and wherein the centroid is shifted for a pixel bordering an edge of a text-like structure.

9. The method of claim 8 and including providing increased exposure times for pixels whose centroids are shifted as compared to exposure, times for pixels whose centroids are not shifted.

10. The method of claim 7 and including:
generating a third signal that represents a determination that image data associated with the pixel represents text-like information;
generating a fourth signal that the pixel is at an edge of the text-like information; and
generating the second multibit signal to shift the centroid of the pixel in response to said fourth signal.

11. The method of claim 10 and including in response to said fourth signal and a signal representing density of said pixel generating said first multibit data signal.

12. The method according to claim 11 and including the step of inputting into a look-up table memory said third and fourth signals to generate said first multibit data signal.

13. The method of claim 12 and wherein the pixel is recorded on an electrophotographic recording medium.

14. A non-impact printer apparatus comprising:
a recording medium;
means including a plurality of selectively activatable recording elements for recording an image;
driving means, responsive to an enablement signal, for driving the recording elements for recording the image;
control means for controlling enablement times of the driving means for driving the recording elements during a main line pixel recording period for recording a line of pixels by said plural recording elements, said control means including:
(a) register means associated with each recording element for storing a respective first multibit data signal representing a recording duration for recording a pixel by a respective recording element during one of plural sub-line recording periods comprising said main line period,
(b) counter means for generating during each sub-line period a series of signals representing a time-changing count during a count cycle, the count recycling to establish plural pixel recording periods during said main line recording period, and
(c) comparator means for comparing a second multibit signal with a signal representing a particular sub-line period and for comparing the first multibit data signal with said count to enable the driving means during the particular sub-line period for a time related to said first multibit data signal; and wherein the counter means during each sub-line period is in a count-down and count-up mode.

15. The apparatus of claim 14 and wherein the control means includes second counter means for generating said signal representing a particular sub-line period.

16. The apparatus of claim 15 and including means for generating a first multibit signal representing a centroid shift of the pixel from a central position in the main line recording period.

17. The apparatus of claim 14 and including means for generating a first multibit signal representing a centroid shift of the pixel from a central position in the main line recording period.

18. The apparatus of claim 14 and wherein the recording elements are light-emitting diodes.

19. The apparatus of claim 14 and wherein the recording elements comprise a stationary linear array that extends in a first direction across a substantial portion of a transverse width of the recording medium.

20. The apparatus of claim 19 and including means for driving the recording medium in a second direction relative to the recording elements, the second direction being perpendicular to said first direction.

21. The apparatus of claim 1 and wherein the recording elements comprise a stationary linear array that extends in a first direction across a substantial portion of a transverse width of the recording medium.

22. The apparatus of claim 21 and including means for driving the recording medium in a second direction relative to the recording elements, the second direction being perpendicular to said first direction.

* * * * *